W. F. FOLMER.
PHOTOGRAPHIC EXPOSING MECHANISM.
APPLICATION FILED OCT. 30, 1913.

1,139,023.

Patented May 11, 1915.

2 SHEETS—SHEET 1.

Witnesses
Walter B. Payne
Russell B. Griffith

Inventor
William F. Folmer
By Church & Rich
his Attorneys

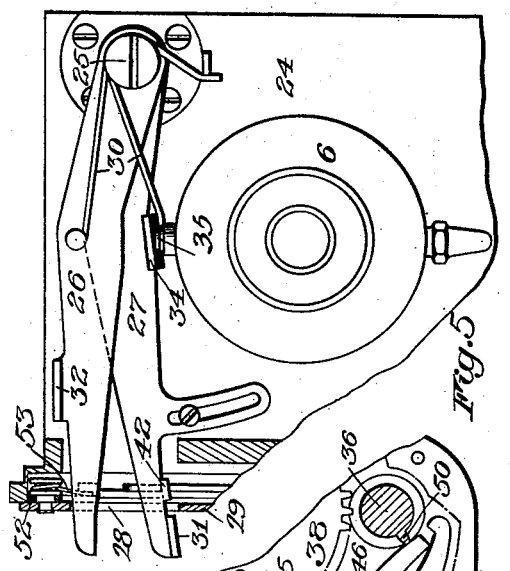

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC EXPOSING MECHANISM.

1,139,023.   Specification of Letters Patent.   Patented May 11, 1915.

Application filed October 30, 1913. Serial No. 798,227.

*To all whom it may concern:*

Be it known that I, WILLIAM F. FOLMER, of Rochester, in the county of Monroe and State of New York, have invented certain new and useful Improvements in Photographic Exposing Mechanisms; and I do hereby declare the following to be a full, clear, and exact description of the same, reference being had to the accompanying drawings, forming a part of this specification, and to the reference-numerals marked thereon.

My present invention relates to photography and more particularly to photographic cameras or film exposing mechanisms, and it has for its object to provide simple and efficient means in connection with the shutter and film feeding devices whereby one is subject to the control of the other and the making of two exposures on a single picture area of the film as well as uselessly feeding an area of film into and out of the field of exposure without exposing it is prevented.

A further object of the invention is to provide, in connection with the shutter mechanism, an electrical switch mechanism in the circuit of an object illuminating device so that the latter will be controlled in a semi-automatic manner to certain ends, the present invention being embodied in a camera of the type further described and otherwise claimed in my companion application, Serial No. 798,226 filed October 30, 1913.

To these and other ends the invention consists of certain improvements and combinations of parts, all as will be hereinafter more fully described, the novel features being pointed out in the claims at the end of the specification.

Figure 1:
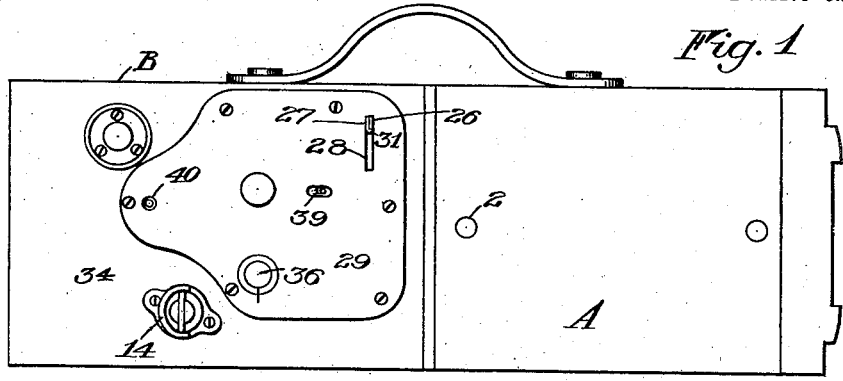
Figure 2:
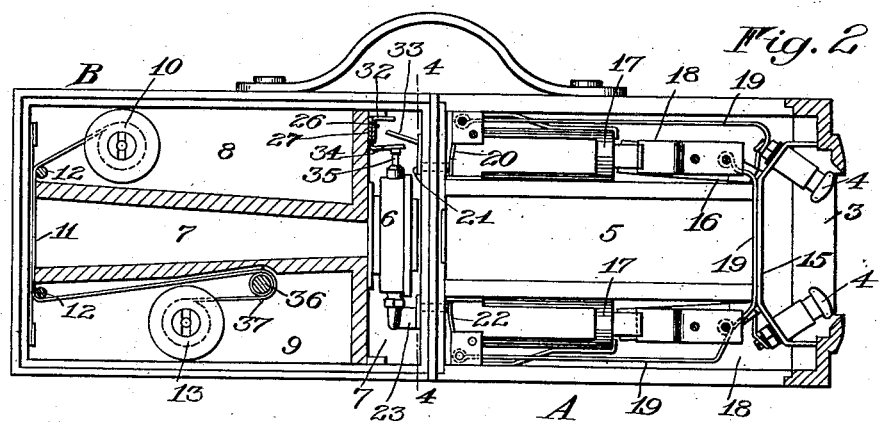
Figure 3:
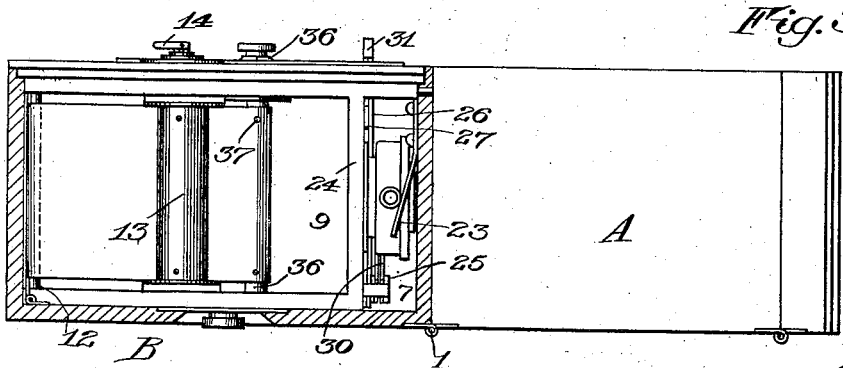

In the drawings: Figure 1 is a side elevation of a photographic camera constructed in accordance with and illustrating one embodiment of my invention; Fig. 2 is a central vertical section therethrough; Fig. 3 is a bottom view taken in transverse section through the rear section of the camera body, only, in the plane of the upper face of its bottom wall; Fig. 4 is a transverse section taken substantially on the line 4—4 of Fig. 2, showing the shutter proper in front elevation and also parts of its controlling mechanism; Fig. 5 is a similar view, and Figs. 6, 7 and 8 are elevations, partly in section, of the inner side of the carrying plate for the shutter and film winding controls, respectively showing the various parts in different positions at various stages of the cycle of operation.

Similar reference numerals in the several figures indicate the same parts.

For general features of construction of the specific camera in which my present invention is shown to be embodied, reference is made to the other application mentioned which states the camera to be designed more particularly for such work as making photographic records of the readings of gas meters. The general structure will, therefore, be but briefly described herein.

In this view and referring more particularly to the drawings, A indicates the front section and B the rear section of a camera casing, which sections are hinged together at 1 (Fig. 3) to form a continuous body when secured by a catch 2. The front section is provided with a chamber 3 at the front containing object illuminating devices embodying electric lamps 4. Leading rearwardly from the lamp chamber is a light chamber 5 in alinement with which is located a lens and shutter casing 6 located in a compartment or chamber 7 at the forward end of the rear section B. The shutter controls the admission of light to the exposure chamber 7 occupying the center of the section B, while on either side of the exposure chamber are provided film chambers 8 and 9. The feed spool 10 for the charged roll of film is, in the present instance, located in the upper chamber 8 and the film strip 11 is drawn therefrom over guide rollers 12 across the rear end of the exposure chamber 7 by the winding spool 13 for the exposed roll of film located in the chamber 9 and provided on the exterior of the casing with a winding key 14, as usual.

The circuits for the lamps 4 are fully described in the other case and it is, therefore, sufficient to say here that they include the plate 15 on which they are mounted, connections 16 to batteries 17 located in chambers 18 arranged laterally of the light chamber 5 in the front section A and back through wires 19. Before returning, however, the current traverses contacts 20 and 21 on the front and rear sections, respectively, that are in coöperation when the sections are held together and also contacts 22 and 23 similarly arranged on the respective parts, the last mentioned contact being in engagement with a portion of the shutter casing 6 through which latter the circuit is completed subject to a switch device that will now be described.

Mounted on the rear wall 24 of the shutter chamber 7 and preferably on the same pivot 25 are a pair of levers 26 and 27, the opposite or free ends of which project through a slot 28 in a plate 29 mounted on the side wall of the casing and carrying certain controlling mechanism to be later described, said projecting portions being exteriorly accessible to the fingers of the operator. In their normal or raised positions in which they are held by springs 30, they are substantially coincident with each other, as shown in Figs. 1 and 4, particularly at the finger portions where the under lever 27 is interlocked with the upper lever 26 for joint downward movement therewith by virtue of a laterally turned lip 31 thereon. The upper lever 26 constitutes a switch lever for the lamp circuit, being provided with a laterally projecting flange 32 in a position to engage a leaf 33 on the contact 21 (Fig. 2) when the lever is depressed, whereas the under lever 27 constitutes a shutter operating member being provided also with a laterally projecting ear or flange 34 arranged to actuate a shutter actuating plunger 35 on the shutter casing 6 when the lever is depressed. The two levers are, of course, in electrical contact with each other, as well. The shutter, indicated generally at 6 is, in the present instance, of the automatic type so that a single downward actuation of the plunger 35 opens and closes the shutter aperture, while the return of the plunger, when permitted, accompanies the resetting of the shutter blades. It will thus be seen that the result of depressing both levers is to close the circuit through the lamps 4, illuminating the object, and to simultaneously open and close the shutter aperture.

The film feeding mechanism, in addition to the parts already described, comprises as well a film measuring device that embodies, in the present instance, a roll 36 (Figs. 3 and 8) journaled in the side walls of the film winding chamber 9 in parallelism to the film spools 10 and 13. The film strip 11 in passing from the supply to the take-up roll passes over this roller 36 which is provided with spurs 37 that impale the opposite edges of the strip to prevent slipping, so that a given number of revolutions of the roll indicates that an area of film equal to that multiple of its circumferential length has been fed both into and out of the field of exposure and representing, in each instance, an exposure area of the strip. Of course, neither the feed spool nor the winding spool can be used for this purpose, as the diameter and circumferential length of each is constantly changing.

In the present instance, a single revolution of the roll 36 measures off an exposure area and may, in so doing, turn a relatively larger indicating wheel 38 a sufficient distance to bring successive characters thereon past a sight opening 39 in the carrying plate 29, in which this wheel, as well as one end of the roll 36, is journaled. A further indicating wheel 39ª, having characters of greater denomination, viewable through a sight opening 40, may also be provided to be rotated once upon each revolution of the wheel 38 by the contact of a pin 41 on the margin of the latter.

When the two levers 26 and 27 are depressed for the beforementioned respective purposes, another laterally turned ear or flange 42 on the shutter operating lever 27 is engaged and locked by a detent 43 pivoted at 44 and pressed toward the lever by a spring 45, which also operates to maintain an arm 46 on the detent beyond the pivot against the periphery of a portion of the film measuring roll 36, all as shown in Fig. 6. At the same time, this flange 42 on the shutter operating lever deflects laterally the arm 47 of a lever also pivoted at 44 and the opposite arm 48 of which constitutes a detent subject to the influence of a spring 49 that normally holds it in a position to engage an abutment 50 on the film measuring roll 36. This deflection of the lever 47 releases it from pressure upon the arm 51 of a bell crank detent 52 and allows the latter under the influence of a spring 53 to go into locking position against the switch lever 26 when the latter is returned by its spring 28. The spring 49 of the lever 47 is superior to the spring 53, so that the detent 52 is out of operative position before the levers 26 and 27 are depressed and hence does not prevent the depression of the switch lever 26 at that time.

When the film measuring roll 36 is rotated from the position of Fig. 6, after being released from the detent 48, it will be seen that just before it completes an entire revolution, it will act as a trip against the arm 46 of the detent 43, as indicated in Fig. 7.

In the operation of the entire mechanism, Fig. 8 may be considered to show the normal positions of the various controlling parts. As there shown, the projection or trip 50 on the measuring roll 36 has passed beyond the end of the detent arm 46 and been halted against further winding of the film strip by the detent 48. At this point, an unexposed picture area on the strip is drawn across the end of the exposure chamber 7 in position for exposure and, therefore, for the time being, it cannot be further moved. To make an exposure, both levers 26 and 27 are simultaneously depressed, the detent 52 being held out of position by the lever 47. The switch lever 26 on its part closes the circuit to the lamps 4 at the contact 33 and illuminates the object, as previously mentioned. The shutter operating member 27 simultaneously depresses the shutter actuating plunger 35, causing an opening and closing of the shutter aperture and the act of taking the picture or exposure is completed. Now, while the switch lever 26 is free to return to normal position and does so return as soon as the pressure of the finger is removed, being locked in that position by the spring detent 52 which the shutter operating lever has meanwhile released from the pressure of the spring arm 47, the shutter lever 27 is retained in its depressed position by the detent 43, as shown in Fig. 5. In moving the arm 47, it has released the abutment 50 on the film measuring roll 36 from the detent 48 and the film strip, hitherto locked, may now be fed the distance of one picture area or through one revolution of the measuring roll 36, bringing a fresh or unexposed area into the field of exposure and until this is done, and while it is being done, the shutter is held locked by the detent 43 against opening. As soon as the film measuring roll 36 has completed its single revolution, the abutment 50 trips the detent 43 by engagement with the arm 46 and releases the shutter operating lever 27 which flies back to the side of the switch lever 26 that has meanwhile been held by its detent 52 against uselessly closing the circuit to the lamps. Upon its return, it allows the detent 48 to go back into engagement with the abutment or trip 50 on the measuring roll, again locking the latter until the completion of another exposure, and the other arm 47 of the detent moves the switch lever detent 52 to inoperative position ready for another actuation of the switch, all as shown in Fig. 8. It will thus be seen that the shutter mechanism prevents winding of the film until an exposure has been completed, on the one hand, and the film winding mechanism prevents a subsequent opening of the shutter until the exposed area of film has been withdrawn from the field of exposure and a fresh area substituted. Two exposures, therefore, cannot be made on the same film surface and the film cannot be withdrawn from the field of exposure until it has been exposed.

A further object for providing the two levers 26 and 27, and locking the former in the normal position to which it returns while the latter is held locked in its depressed position, the levers being thus relatively immovable until the winding is completed, is to impress upon the attention of the operator at this point that the winding of the film is the next operation to be performed. All he has to bear in mind is that when the levers are together, the camera is ready for an exposure, while when they are separated, the winding must take place to return them.

I claim as my invention:

1. In a photographic camera, the combination with a film feeding mechanism embodying a carrying plate having gearing thereon, of shutter mechanism embodying a lever extending transversely of the plate, and pivoted members on the plate coöperating with both the gearing of the feeding mechanism and the shutter lever to control one mechanism through the medium of the other.

2. In a photographic camera, the combination with a film feeding mechanism embodying a carrying plate having gearing mounted thereon and provided with a slot, of a shutter mechanism embodying a lever extending through the slot, a trip pivoted on the plate to coöperate with the shutter lever and adapted to be actuated by the feeding mechanism and a second trip pivoted on the plate to coöperate with the feeding mechanism and adapted to be actuated by the shutter lever.

3. In a photographic camera, the combination with a film feeding mechanism and a shutter mechanism, of a detent for the shutter mechanism arranged under the control of the feeding mechanism and a detent for the feeding mechanism arranged under the control of the shutter mechanism.

4. In a photographic camera, the combination with a film feeding mechanism and a shutter mechanism, of a detent for the shutter mechanism, a trip actuated by the feeding mechanism for releasing said detent and a detent under the control of the shutter mechanism adapted to engage the trip and restrain the feeding mechanism through the medium thereof.

5. In a photographic camera, the combination with a shutter and a film feeding mechanism, of two levers having substantially coincident normal positions and adapted to be simultaneously depressed, one of said levers constituting a shutter operating member, means for returning the levers to normal positions, means under the control of the feeding mechanism for detaining the shutter operating lever in depressed position after an actuation of the shutter while allowing the return of the other lever to normal position, and means under the control of the shutter operating lever for detaining said last mentioned lever in normal position until the shutter operating lever has returned to normal position.

6. In a photographic camera, the combination with a film feeding mechanism and a shutter, of two levers having substantially coincident normal positions and adapted to be simultaneously depressed, one of said levers constituting a shutter operating member, means for returning the levers to normal positions, a detent for restraining the operating lever in its operated position and connected with the winding mechanism to be released thereby, a detent for holding the other lever in its normal position and means released by the return of the operating lever for releasing said last mentioned detent.

7. In a photographic camera, the combination with a film feeding mechanism and a shutter mechanism, of two levers having substantially coincident normal positions and adapted to be simultaneously depressed, one of said levers constituting a shutter operating member, means for returning the levers to normal positions, a detent for restraining the operating lever in its operated position and connected with the winding mechanism to be released thereby, a detent for restraining the winding mechanism movable into operative position upon the return of the operating lever to normal position, and a detent for holding the other lever in normal position released by the last mentioned movement of the film winding detent.

8. In a photographic camera, the combination with an object illuminating device embodying an electric lamp, an electrical circuit including said lamp and a shutter mechanism, of a pair of levers arranged for joint operation, one constituting a switch in said circuit and the other an operating member for the shutter, a detent for restraining the switch lever and means under the control of the shutter operating lever for releasing said detent.

9. In a photographic camera, the combination with an object iluminating device embodying an electric lamp, an electric circuit including said lamp, and a film feeding mechanism, of means under the control of the shutter mechanism for restraining the film feeding mechanism, means under the control of the latter for restraining the shutter mechanism and a detent controlled by one of said means for maintaining the switch in open position.

WILLIAM F. FOLMER.

Witnesses:
NELSON H. COPP,
RUSSELL B. GRIFFITH.